(12) United States Patent
Han et al.

(10) Patent No.: US 7,044,804 B2
(45) Date of Patent: May 16, 2006

(54) OPTICAL-ELECTRIC CONNECTOR

(75) Inventors: Hongqiang Han, Kunsan (CN);
Guohua Zhang, Kunsan (CN);
ZiQiang Zhu, Kunsan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/991,885

(22) Filed: Nov. 17, 2004

(65) Prior Publication Data

US 2005/0105856 A1    May 19, 2005

(30) Foreign Application Priority Data

Nov. 19, 2003    (CN)    ........................ 2003201198267

(51) Int. Cl.
*H01R 24/04*    (2006.01)
(52) U.S. Cl. .................... 439/668; 439/577; 385/75
(58) Field of Classification Search ................ 439/668, 439/669, 577, 344; 385/88, 89, 75
See application file for complete search history.

(56) References Cited

U.S. PATENT DOCUMENTS

| | | | |
|---|---|---|---|
| 4,547,039 A * | 10/1985 | Caron et al. ................ | 385/88 |
| 4,869,566 A | 9/1989 | Juso et al. | |
| 5,338,215 A * | 8/1994 | Lee et al. .................... | 439/188 |
| 6,000,970 A * | 12/1999 | Wu .............................. | 439/669 |
| 6,056,602 A * | 5/2000 | Wu .............................. | 439/668 |
| 6,109,797 A | 8/2000 | Nagura et al. | |
| 6,238,249 B1 * | 5/2001 | Kuwamura ................. | 439/668 |
| 6,394,841 B1 | 5/2002 | Matsuura | |
| 6,471,546 B1 * | 10/2002 | Zhu et al. .................... | 439/607 |
| 6,475,001 B1 * | 11/2002 | Ohbayashi et al. ........... | 439/83 |
| 6,588,947 B1 | 7/2003 | Mine et al. | |
| 6,790,095 B1 * | 9/2004 | Liu .............................. | 439/668 |
| 6,887,111 B1 * | 5/2005 | Nakai et al. ................ | 439/669 |
| 6,918,799 B1 * | 7/2005 | Zhu et al. .................... | 439/862 |
| 2005/0020140 A1 * | 1/2005 | Zhang et al. ............... | 439/668 |
| 2005/0100285 A1 * | 5/2005 | Han et al. .................... | 385/75 |

\* cited by examiner

*Primary Examiner*—Hae Moon Hyeon
(74) *Attorney, Agent, or Firm*—Wei Te Chung

(57) ABSTRACT

An optical-electric connector (1) has an insulative housing (10), a number of contacts (21, 22, 23, 24, 25) received in the housing, a spacer (15) and an optical-electric converter (30) assembled in the housing. The housing defines a receiving space (14) for receiving a mating plug and a plurality of passageways (16) for receiving the contacts. The spacer is installed in a rear side of the insulative housing for covering the receiving space. The spacer has a supporting body formed at an inner wall thereof for accommodating the optical-electric converter thereon.

14 Claims, 5 Drawing Sheets

OPTICAL-ELECTRIC CONNECTOR

CROSS-REFERENCE TO RELATED APPLICATIONS

This application is related to contemporaneously filed application entitled "OPTICAL-ELECTRIC CONNECTOR", which is invented by the same inventor and assigned to the same assignee as this application.

BACKGROUND OF THE INVENTION

1. Field of the Invention

The present invention generally relates to a connector, and particularly relates to an optical-electric connector which can selectively mate with an electric plug or an optical fiber plug.

2. Description of Prior Arts

U.S. Pat. No. 6,238,249 discloses an optical-electric connector comprising an insulative housing, an optical-electric converter assembled in the housing, which receives and transmits an optical signal from/to the optical plug when the optical plug is connected to the optical-electric connector, and a plurality of terminals received in the housing.

A problem has been found when the basic structure of the low profile connector disclosed in the above-mentioned patent is applied to the high profile design. The problem is that if the optical-electric connector is straightly mounted on a printed circuit board, it's difficult to insert and precisely position the optical-electric converter into the housing from a bottom end.

Hence, it is desirable to have an improved optical-electric connector to overcome the above-mentioned disadvantages of the prior art.

SUMMARY OF THE INVENTION

It is an object of the present invention to provide an optical-electric connector with an improved structure of insulative housing which can easily and precisely position an optical-electric converter therein.

In order to achieve the above-mentioned object, an optical-electric connector in accordance with the present invention has an insulative housing, a plurality of contacts received in the housing and an optical-electric converter assembled in the housing. The housing defines a receiving space for receiving a mating plug, a plurality of passageways for receiving the contacts and a spacer installed in a rear side of the insulative housing for covering the receiving space.

Other objects, advantages and novel features of the invention will become more apparent from the following detailed description of the present embodiment when taken in conjunction with the accompanying drawings.

DETAILED DESCRIPTION OF THE PREFERRED EMBODIMENT

Figure 1:
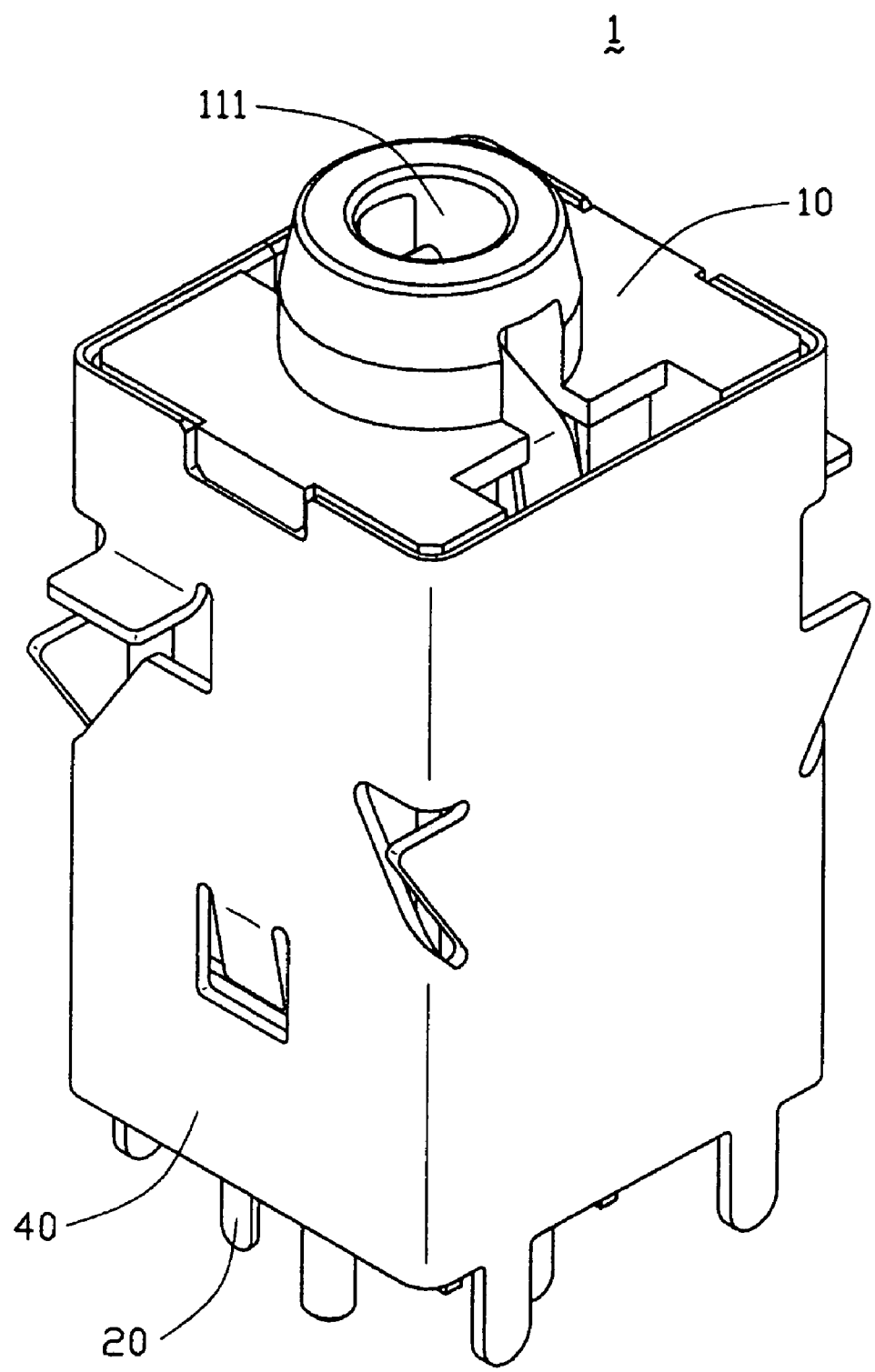
FIG. 1 is a perspective view of an optical-electric connector in accordance with the present invention.

Reference will now be made to the drawing figures to describe the present invention in detail.

With reference to FIGS. 1 to 4, an optical-electric connector in accordance with the present invention is a straight-shaped jack connector 1 and comprises an insulating housing 10, a plurality of contacts 20, a spacer 15, an optical-electric converter 30 and a metal shielding 40 enclosing the housing 10.

The insulative housing 10 is straight-shaped and comprises a mating portion 11, a mounting portion 12, three side portions 13 connecting the mating and mounting portion 11, 12, and a receiving space 14. The housing 10 defines a plurality of passageways 16 for receiving the contacts 20. Four guiding posts 18 are provided on rear edges of two side portions 13. A front side portion 13 defines a plurality of recesses 19.

The mating portion 11 of the insulative housing 10 forms a cylinder-shaped mating end 110 defining a plug receiving opening 111 extending through the mating portion 11 and communicating with the receiving space 14. The plug receiving opening 111 mates with an electric or optical fiber plug (not shown) for transmitting signals. The receiving space 14 of the insulative housing 10 divides into two parts by a partition 17. A first part 140 is above the partition 17, and a second part 141 is below the partition 17.

The partition 17 comprises an upper and a lower surfaces 170, 171 and a plug receiving hole 172 extending through the upper and lower surfaces 170, 171. The plug receiving hole 172 has a funnel-shaped portion 173 at a top end thereof for receiving the electric or optical fiber plug. The plug receiving hole 172, the funnel-shaped portion 173, and the plug receiving opening 111 of the mating end 110 have a same axis. A pair of opposite engaging plates 130 extend downwardly from the partition 17. Each engaging plate defines an engaging groove 131.

Figure 2:
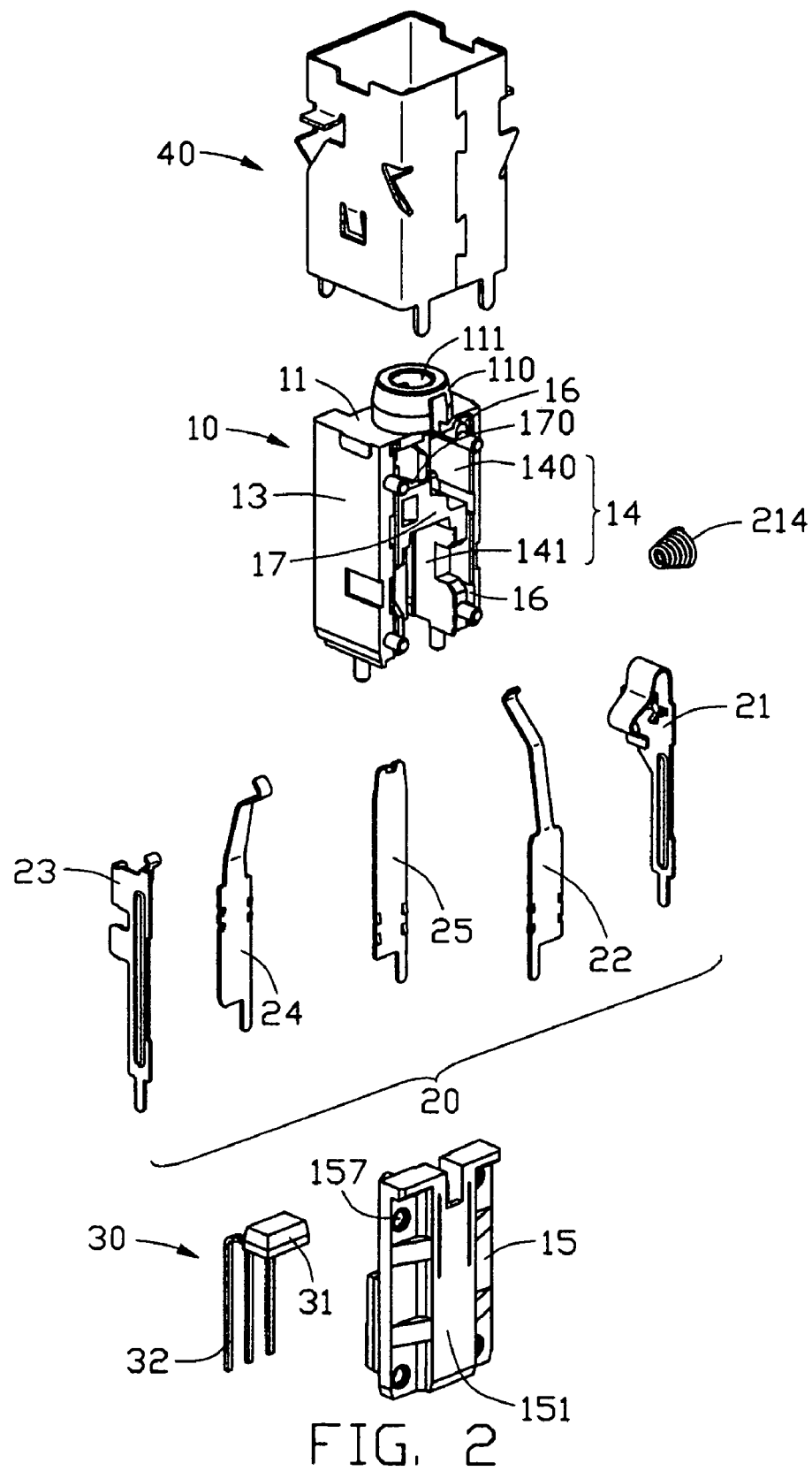
FIG. 2 is an exploded, perspective view of the optical-electric connector of FIG. 1.
Figure 3:
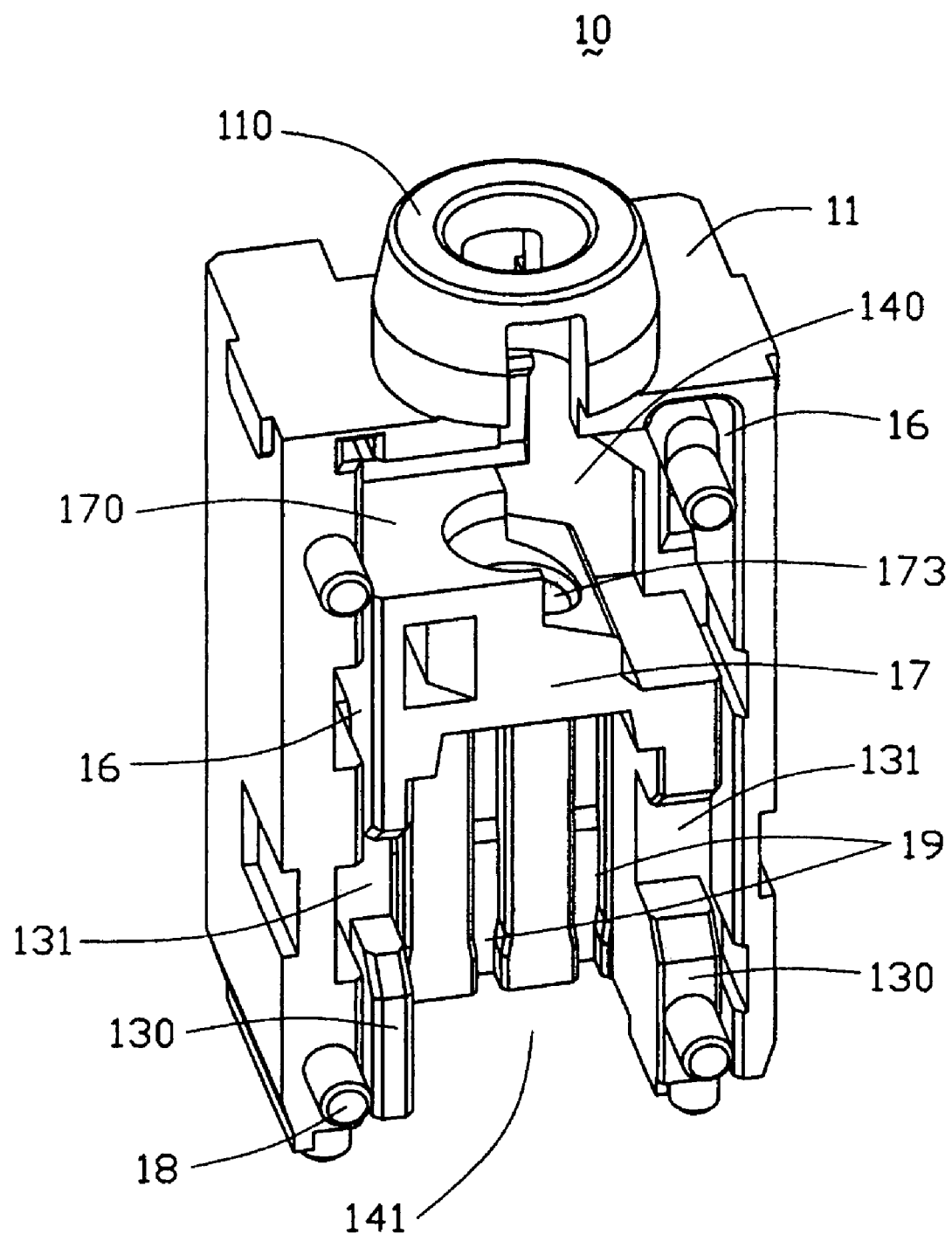
FIG. 3 is a perspective view of an insulative housing of the optical-electric connector.
Figure 4:
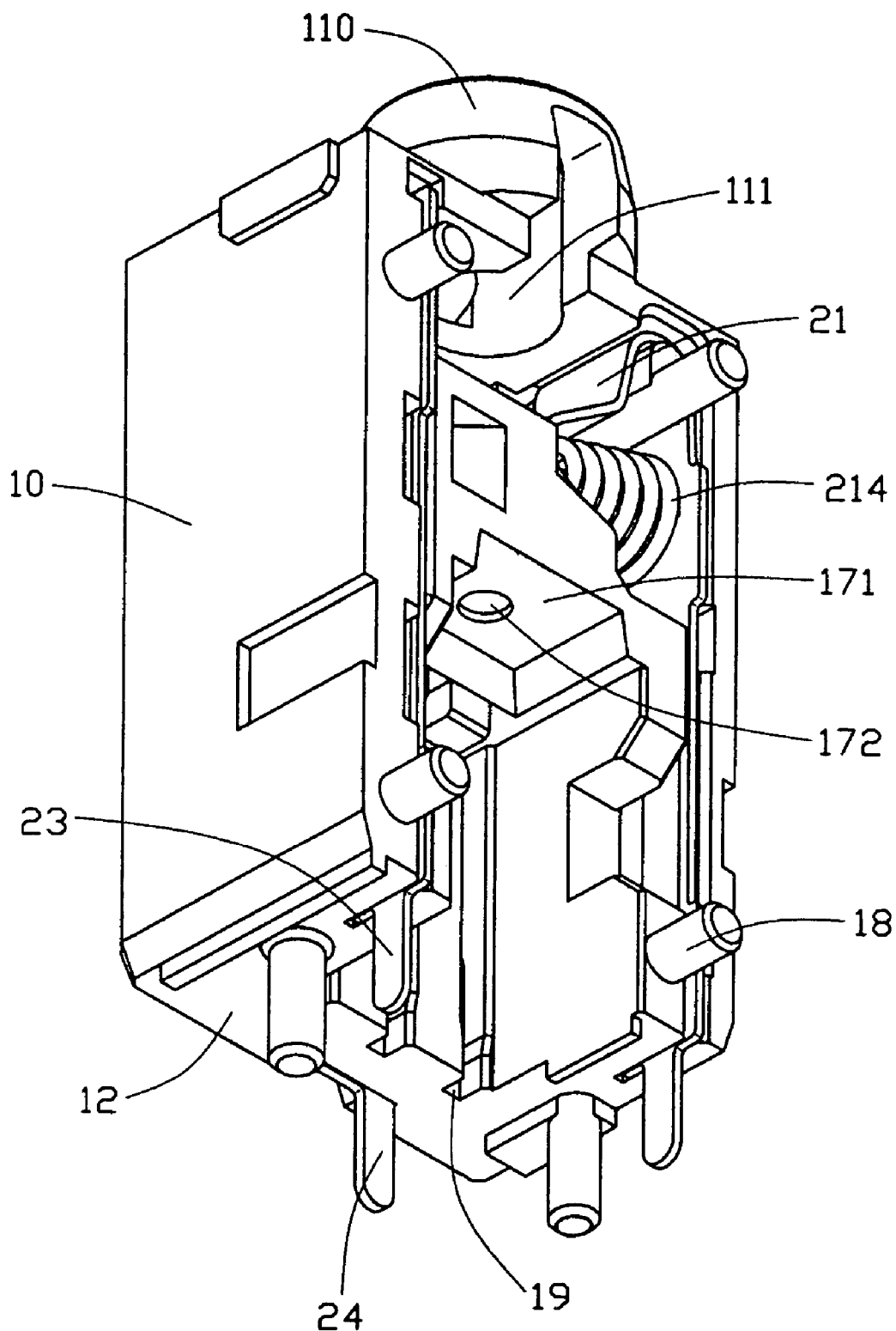
FIG. 4 is an assembled, perspective view of the insulative housing and contacts.
Figure 5:
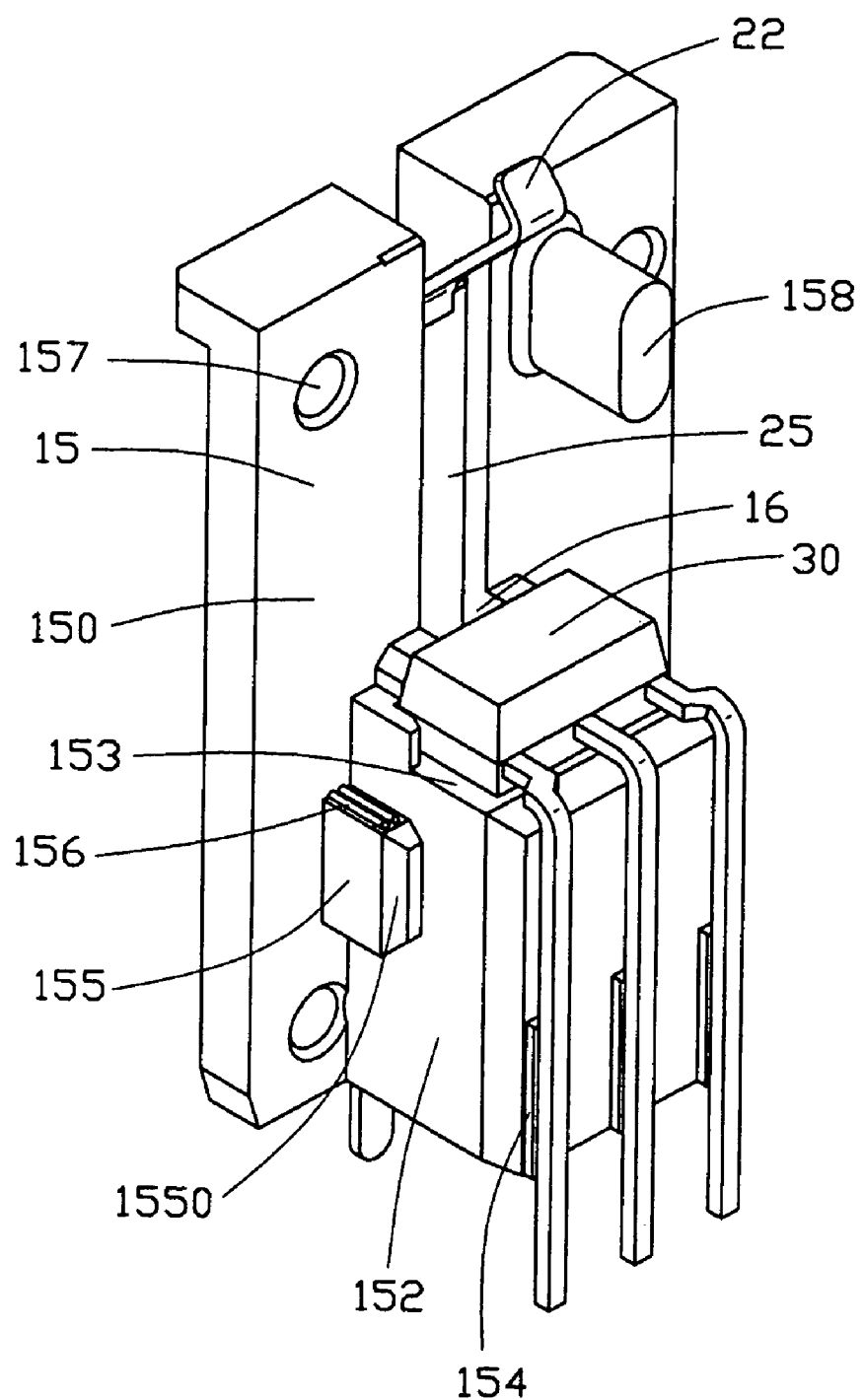
FIG. 5 is an assembled, perspective view of a spacer, an optical-electric converter, and the contacts of FIG. 2.

Turning to FIG. 5, the spacer 15 comprises an inner wall 150 facing the receiving space 14 and a T-shaped outer wall 151 (FIG. 2). A supporting body 152 formed at the inner wall 150 accommodates the optical-electric converter 30 thereon. The optical-electric converter 30 is designed to receive and transmit an optical signal from/to the optical fiber plug when the optical fiber plug is matching with the optical-electric connector. A plurality of ribs 154 provided vertically on a front surface of the supporting body 152. The optical-electric converter 30 comprises an engaging portion 31 positioned on a top surface 153 of the supporting body 152, and a plurality of tail portions 32 extending downwardly along corresponding ribs 154 of the supporting body 152. A pair of engaging blocks 155 are formed on opposite sides of the supporting body 152. Each engaging block 155 comprises a plurality of protrusions 156 for assuring an engaging with the engaging groove 131, and a wedge of guiding section 1550 extending forwardly. A projection 158 extends from the inner wall 150 into the first part 140 for securing the spacer 15. Four apertures 157 are defined at opposite corners and extend through the inner and the outer walls 150, 151 of the spacer 15. The apertures 157 respectively mate with corresponding guiding posts 18 of the insulative housing 10. The spacer 15 connects the insulative housing 10 securely by heating the apertures 157 and the guiding posts 18, as well known in the art.

The contacts 20 are installed in the passageways 16 of the insulative housing 10. The contacts 20 include four resilient contacts 21, 22, 23, 24 and a fixed contact 25. The four resilient contacts 21, 22, 23, 24 are assembled into the side portions 13 and the spacer 15 respectively. The fixed contact 25 is assembled to the spacer 15 and contacts the resilient contact 24 (FIG. 5). Upper ends (not labeled) of the four resilient contacts 21, 22, 23, 24 extend into the first part 140 and tail ends (not labeled) are soldered to a printed circuit board (not shown). A cone-shaped spring is assembled to the resilient contact 21 for assuring a reliable, electrical connecting with an inserted, complementary plug.

When the spacer 15 is assembled to the insulative housing 10, the supporting body 152 extends into the second part 141 of the receiving space 14 between opposite engaging plates 130. The engaging blocks 155 is engaged in corresponding engaging grooves. The engaging portion 31 of the optical-electric converter 30 is below the plug receiving hole 172 and adjacent to the partition 17, and the tail portions 32 are retained in corresponding recesses 19 of the insulative housing 10. The tail portions 32 extend outside of the housing 10 and are soldered to the PCB.

In use, the electric plug is inserted into the plug receiving opening 111 of the mating end 110, and electrically contacts the resilient contacts 21, 22, 23, 24. Due to the funnel-shaped portion 173 of the partition 17 which has a larger diameter at an upper end, and a smaller diameter at a lower end, the electric plug can be exactly inserted into the upper end of the funnel-shaped portion 173 and received in the first part 140. When an optical fiber plug is inserted into the housing 10, the optical fiber plug rests in the funnel shaped portions 173 and matches the engaging portion 31 of the optical-electric converter 30 for transmitting signals.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the fill extent indicated by the broad general meaning of the terms in which the appended claims are expressed.

We claim:

1. An optical-electric connector comprising:
   an insulative housing defining a receiving space and a plurality of passageways;
   a plurality of contacts received in the passageways of the insulative housing;
   an optical-electric converter installed in the insulative housing, the converter having an engaging portion for matching an optical fiber plug and a plurality of tail portions; and
   a spacer installed in a rear side of the insulative housing and supporting the converter;
   wherein the spacer comprises an inner wall facing the receiving space, a supporting body formed at the inner wall thereof and accommodating the optical-electric converter thereon, and a plurality of ribs provided on a front surface of the supporting body, and the engaging portion of the optical-electric converter is positioned on a top surface of the supporting body and the tail portions extend downwardly along corresponding ribs of the supporting body.

2. The optical-electric connector as described in claim 1, wherein the housing comprises a partition positioned in the receiving space, the partition dividing the receiving space into an upper first part and a lower second part.

3. The optical-electric connector as described in claim 2, wherein the housing comprises a pair of opposite engaging plates extending downwardly from the partition.

4. The optical-electric connector as described in claim 3, wherein the supporting body extends into the second part of the receiving space between opposite engaging plates.

5. The optical-electric connector as disclosed in claim 4, wherein each engaging plate defines an engaging groove, and the supporting body defines a pair of engaging blocks on opposite sides thereof engaging in corresponding engaging grooves.

6. The optical-electric connector as disclosed in claim 2, wherein the insulative housing comprises a mating portion defining a plug receiving opening extending therethrough and communicating with the receiving space.

7. The optical-electric connector as described in claim 6, wherein the partition defines a plug receiving hole for mating with an optical fiber plug, the plug receiving hole and the plug receiving opening of the mating portion having a same axis.

8. An optical-electric connector comprising:
   an insulative housing defining a receiving space and a plurality of passageways;
   a plurality of contacts received in the passageways of the insulative housing;
   an optical-electric converter installed in the insulative housing, the converter having an engaging portion for matching an optical fiber plug and a plurality of tail portions; and
   a spacer installed in a rear side of the insulative housing and supporting the converter;
   wherein the insulative housing comprises a plurality of side portions, and the contacts include a plurality of resilient contacts assembled into the side portions and the spacer, respectively.

9. The optical-electric connector as described in claim 8, wherein the contacts comprise a fixed contact assembled into the spacer.

10. The optical-electric connector as disclosed in claim 8, wherein a plurality of guiding posts are provided on the rear side of the housing, and a plurality of apertures are defined at and extend through the spacer, the apertures respectively mating with corresponding guiding posts of the insulative housing.

11. The optical-electric connector as described in claim 8, further comprising a metal shielding enclosing the insulative housing.

12. An optical-electric connector comprising:
    an insulative housing defining a receiving space in a front-to-back direction;
    a plurality of contacts received in the insulative housing with contacting arms extending into the receiving space in lateral directions, perpendicular to said front-to-back direction, for mating an electrical plug;
    an optical-electric converter installed in the insulative housing, the converter having an upward engaging portion for mating an optical fiber plug in said front-to-back direction and a plurality of tail portions; and
    a spacer installed in a rear side of the insulative housing and supporting the converter,
    wherein one contact is retained in the spacer with a contacting arm extending into the receiving space.

13. The connector as claimed in claim 12, wherein said spacer is assembled to the housing in a lateral direction perpendicular to said front-to-back direction.

14. The connector as claimed in claim 12, wherein said housing defines a plurality of channels receiving tail portions of the converter.

* * * * *